US012717790B1

(12) United States Patent
Su et al.

(10) Patent No.: US 12,717,790 B1
(45) Date of Patent: Aug. 25, 2026

(54) QUERYING DATABASE SYSTEMS USING QUERIES GENERATED FROM NATURAL LANGUAGE USER INPUT

(71) Applicant: SAP SE, Walldorf (DE)

(72) Inventors: Yongmao Su, Xi'an (CN); Jian Wang, Xi'an (CN); Yuhang Ding, Xi'an (CN); Hailong Zhao, Xi'an (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 19/232,992

(22) Filed: Jun. 10, 2025

(51) Int. Cl.
*G06F 16/21* (2019.01)
*G06F 16/2455* (2019.01)
*G06F 40/20* (2020.01)

(52) U.S. Cl.
CPC ...... *G06F 16/24553* (2019.01); *G06F 16/211* (2019.01); *G06F 40/20* (2020.01)

(58) Field of Classification Search
CPC ... G06F 16/24553; G06F 16/211; G06F 40/20
See application file for complete search history.

(56) References Cited

U.S. PATENT DOCUMENTS 11,900,229 B1 * 2/2024 Swope ..................... G06N 5/01
12,423,519 B1 * 9/2025 Sharma ................... G06F 40/20
12,596,881 B2 * 4/2026 Tunstall-Pedoe ....... G06F 40/35
2025/0181836 A1 * 6/2025 Mehrotra ............. G06F 21/577
2025/0291772 A1 * 9/2025 Hoang .................... G06F 40/40
2025/0315609 A1 * 10/2025 Kosslyn .................. G06F 40/56
2025/0322152 A1 * 10/2025 Osi ....................... G06F 40/216
2025/0328504 A1 * 10/2025 Jaiswal ................. G06F 16/243
2025/0372088 A1 * 12/2025 Greene .................. G06N 3/042
2026/0044610 A1 * 2/2026 Rajaretnam ......... G06F 11/3006
2026/0089369 A1 * 3/2026 Adato ..................... G06F 40/40

* cited by examiner

*Primary Examiner* — Jorge A Casanova
(74) *Attorney, Agent, or Firm* — Fish & Richardson P.C.

(57) ABSTRACT

Methods, systems, and computer-readable storage media for querying database systems using queries generated by prompting of LLMs to generate query statements from natural language, where a LLM system provides a set of query statements in response to user input that is provided in natural language, the set of query statements includes a first query statement provided using an in-context prompt, a second query statement provided using a chain-of-thought (CoT) prompt, a third query statement provided using a contrastive CoT prompt, and a fourth query statement provided using a mixture-of-experts (MoE) prompt, and a query statement is selected from the set of query statements and is used to query a database system, which returns a query result responsive to the query statement.

20 Claims, 5 Drawing Sheets

QUERYING DATABASE SYSTEMS USING QUERIES GENERATED FROM NATURAL LANGUAGE USER INPUT

BACKGROUND

Enterprises can use enterprise applications to support and execute operations. Enterprise applications can be deployed in cloud computing environments, which includes execution of the enterprise applications within a data center of a cloud-computing provider (e.g., as part of an infrastructure-as-a-service (IaaS) offering). Cloud computing can be described as Internet-based computing that provides shared computer processing resources, and data to computers and other devices on demand. Users can establish respective sessions, during which processing resources, and bandwidth are consumed. During a session, for example, a user is provided on-demand access to a shared pool of configurable computing resources (e.g., computer networks, servers, storage, applications, and services). In some instances, clients (e.g., client-side computing devices) transmit requests to a cloud computing environment, which requests are routed to a server for processing.

SUMMARY

Implementations of the present disclosure are directed to generating query statements for querying database systems. More particularly, implementations of the present disclosure are directed to generating query statements from user input that is provided in natural language, a query statement being selected from multiple query statements for querying a database system.

In some implementations, actions include receiving user input including natural language text, generating a set of prompts using the user input, the set of prompts including a first prompt, a second prompt, and a third prompt, prompting a large language model (LLM) using each of the first prompt, the second prompt, and the third prompt to receive a first result responsive to the first prompt, a second result responsive to the second prompt, and a third result responsive to the third prompt, the first result being associated with a first confidence, the second result being associated with a second confidence, and the third result being associated with a third confidence, prompting the LLM based on the first result, the second result, and the third result to provide a first residual confidence associated with the first result, a second residual confidence associated with the second result, and a third residual confidence associated with the third result, aggregating the first confidence and the first residual confidence, the second confidence and the second residual confidence, and the third confidence and the third residual confidence to provide a first combined confidence associated with the first result, a second combined confidence associated with the second result, and a third combined confidence associated with the third result, prompting the LLM using a fourth prompt that is generated based on each of the first result, the second result, and the third result to receive a fourth result responsive to the fourth prompt, the fourth result being associated with a fourth confidence, selecting a query statement from one of the first result, the second result, the third result, and the fourth result based on the first combined confidence, the second combined confidence, the third combined confidence, and the fourth confidence, and executing a query within the database system to provide a query result, the querying including the query statement. Other implementations of this aspect include corresponding systems, apparatus, and computer programs, configured to perform the actions of the methods, encoded on computer storage devices.

These and other implementations can each optionally include one or more of the following features: the first prompt includes an in-context prompt, the second prompt includes a chain-of-though (CoT) prompt, and the third prompt includes a contrastive CoT prompt; the second prompt includes a first example set including at least one correct example and the third prompt includes a second example set including a correct example and an incorrect example; the fourth prompt includes an example set including at least a portion of each of the first result, the second result, and the third result; the example set further includes a correct example and an incorrect example; actions further include querying a vector database at least partially based on the user input to determine context data, wherein each of the first prompt, the second prompt, the third prompt, and the fourth prompt incorporates the context data; and the context data includes a description of a data schema of tables stored within the database system.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
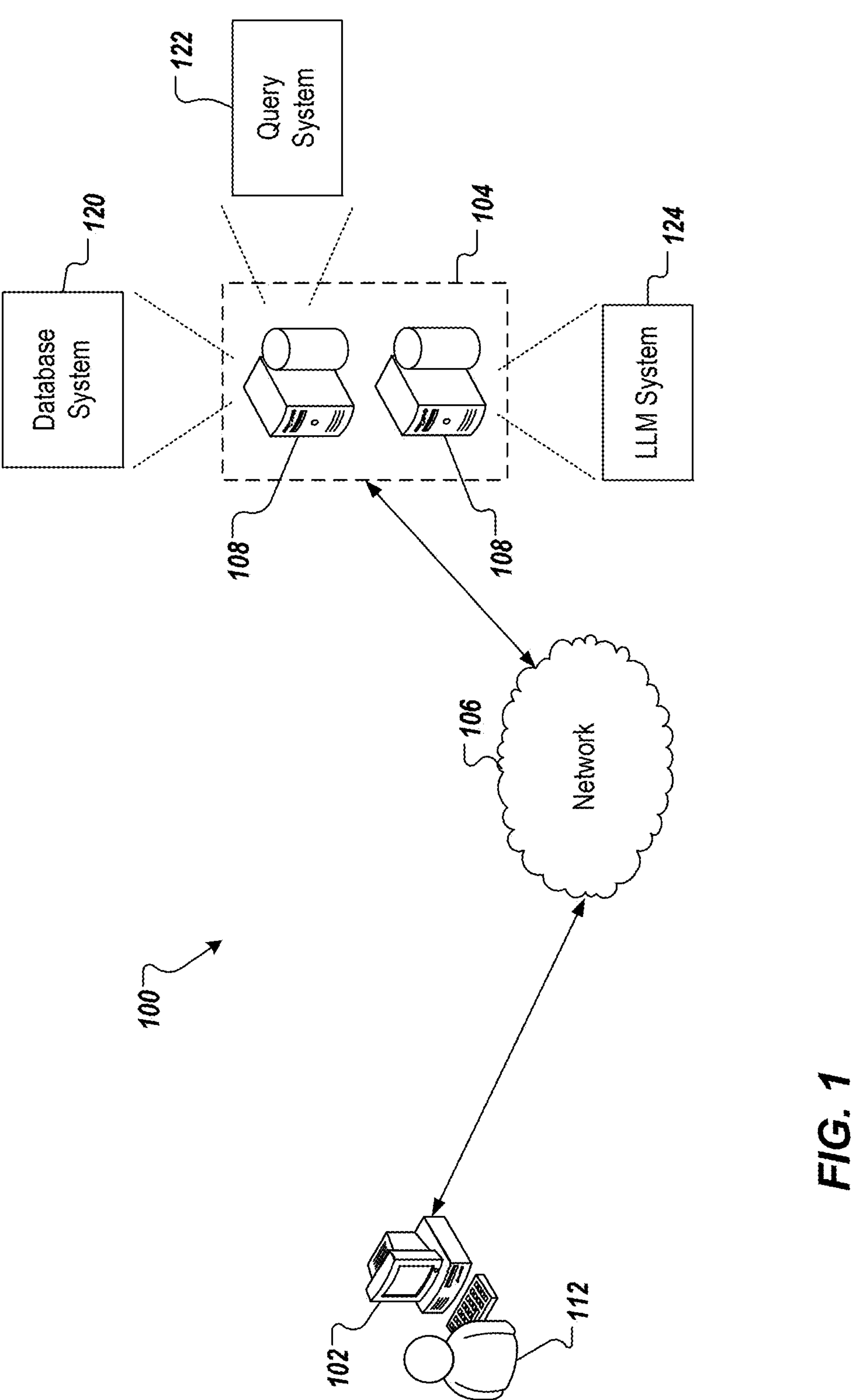
FIG. 1 depicts an example architecture that can be used to execute implementations of the present disclosure.

Implementations of the present disclosure are directed to generating query statements for querying database systems. More particularly, implementations of the present disclosure are directed to generating query statements from user input that is provided in natural language, a query statement being selected from multiple query statements for querying a database system.

Implementations can include actions of receiving user input including natural language text, generating a set of prompts using the user input, the set of prompts including a first prompt, a second prompt, and a third prompt, prompting a large language model (LLM) using each of the first prompt, the second prompt, and the third prompt to receive a first result responsive to the first prompt, a second result responsive to the second prompt, and a third result responsive to the third prompt, the first result being associated with a first confidence, the second result being associated with a second confidence, and the third result being associated with a third confidence, prompting the LLM based on the first result, the second result, and the third result to provide a first residual confidence associated with the first result, a second residual confidence associated with the second result, and a third residual confidence associated with the third result, aggregating the first confidence and the first residual confidence, the second confidence and the second residual confidence, and the third confidence and the third residual confidence to provide a first combined confidence associated with the first result, a second combined confidence associated with the second result, and a third combined confidence associated with the third result, prompting the LLM using a fourth prompt that is generated based on each of the first result, the second result, and the third result to receive a fourth result responsive to the fourth prompt, the fourth result being associated with a fourth confidence, selecting a query statement from one of the first result, the second result, the third result, and the fourth result based on the first combined confidence, the second combined confidence, the third combined confidence, and the fourth confidence, and executing a query within the database system to provide a query result, the querying including the query statement.

Implementations of the present disclosure are described in further detail herein with reference to example products and services provided by SAP SE of Walldorf, Germany. Example products and services include SAP HANA Cloud, which can be described as a database as a service for real-time analytics and applications, and SAP HANA Cloud Central, which can be described as an administrative tool for SAP HANA Cloud, which can be used to create, monitor, and administer instances of SAP HANA Cloud within a cloud computing environment. It is contemplated, however, that implementations of the present disclosure can be realized with any appropriate products and services.

To provide further context for implementations of the present disclosure, database systems can be hosted in cloud computing environments and can store a variety of data that can be processed for various purposes, such as analytics. For example, SAP HANA Cloud can be used to host a database system that can be queried (e.g., by users, by applications). In some examples, a query includes a query statement that is provided in a query language. An example query language is the standard query language (SQL). Query statements are executed by the database system to return a query result (e.g., data stored within the database system that is responsive to the query statement.

Generating accurate query statements (SQL statements) is a challenging task due to the complexity and intricacies of the syntax. This can lead to errors and technical inefficiencies that affect the overall performance of the database system and data integrity within the database system. For example, a poorly constructed query statement can result in errors (e.g., data cannot be returned) and/or inefficient processing (e.g., inefficient consumption of technical resources, such as processing, memory, bandwidth, in processing the query statement). With regard to consumption of technical resources, a poorly constructed query statement can result in increased in consumption of technical resources. For example, a well constructed query statement will consume fewer technical resources to provide the same, or more accurate query result.

In generating query statements, use of generative artificial intelligence (GAI) can be considered. GAI can be described as including so-called foundation models that generate content based on training data. For example, foundation models can include LLMs, which are a form of GAI that can be used to generate text for a variety of use cases. More particularly, LLMs can be leveraged to perform a variety of natural language processing (NLP) tasks. In the example context of query statements, LLMs can be used to convert natural language (e.g., text input by a user to a chatbot) to a query statement.

Undoubtedly, the efficacy and accuracy of natural language to query statement conversion relies heavily on ancillary tools used for prompting LLMs, such as retrieval-augmented generation (RAG). For example, RAG can be used to identify context data from a vector database and the context data is used to prompt a LLM to generate a query statement from natural language. In this manner, the LLM is provided with context (represented in the context data) for the result returned by the LLM. The richness of the dataset in the vector database directly influences the quality of the query statements. However, while developing natural language to query statement conversion, there is a paucity of data representative of certain database systems (e.g., SAP HANA SQL). That is, there is a data scarcity problem.

Here, one challenge is that, while query statements can be generated using RAG, this is within a single context. However, this approach often yields low-quality query statements (e.g., query statements that are inefficient in terms of technical resources consumed to execute within the database system and/or provide inaccurate query results) due to the constraints of this context. Another challenge is that, during generation of query statements, LLMs lack any mechanisms to handle errors, such as syntax errors and logical errors. Another challenge is that generating query statements can be primarily reliant on specific syntax and static rules, resulting in limited flexibility and adaptability to variations in query statements. Moreover, these methods may not comprehensively integrate information from various contexts, leading to inaccuracies in generated query statements. Furthermore, choosing the most accurate query statement from multiple prompts remains a significant challenge due to the lack of sophisticated decision-making algorithms.

In view of the above context, implementations of the present disclosure provide a prompt engine for prompting of LLMs to generate query statements from natural language. As described in further detail herein, implementations of the present disclosure prompt an LLM system to provide a set of query statements in response to user input that is provided in natural language. In some implementations, the set of query statements includes a first query statement provided using an in-context prompt, a second query statement provided using a chain-of-thought (CoT) prompt, a third query statement provided using a contrastive CoT prompt, and a fourth query statement provided using a mixture-of-experts (MoE) prompt. A query statement is selected from the set of query statements and is used to query a database system, which returns a query result responsive to the query statement.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some implementations, and as noted above, the server system 104 can host a database system 120 and a query system 122 that leverages a LLM system 124 to generate query statements (SQL statements) from natural language. For example, the database system 120 can receive queries from users (such as the user 112), which queries are to be executed over data stored in the database system 120. In some examples, the query system 124 receives the user input, which is provided in natural language, and prompts the LLM system 124 to provide query statements. The query system 122 selects a query statement from a set of query statements and the database system 120 is queried using the query statement to provide a query result. Although the database system 120 and the query system 122 are depicted as separate systems in the example of FIG. 1, it is contemplated that the database system 120 and the query system 122 can be provided as a single system.

Figure 2:
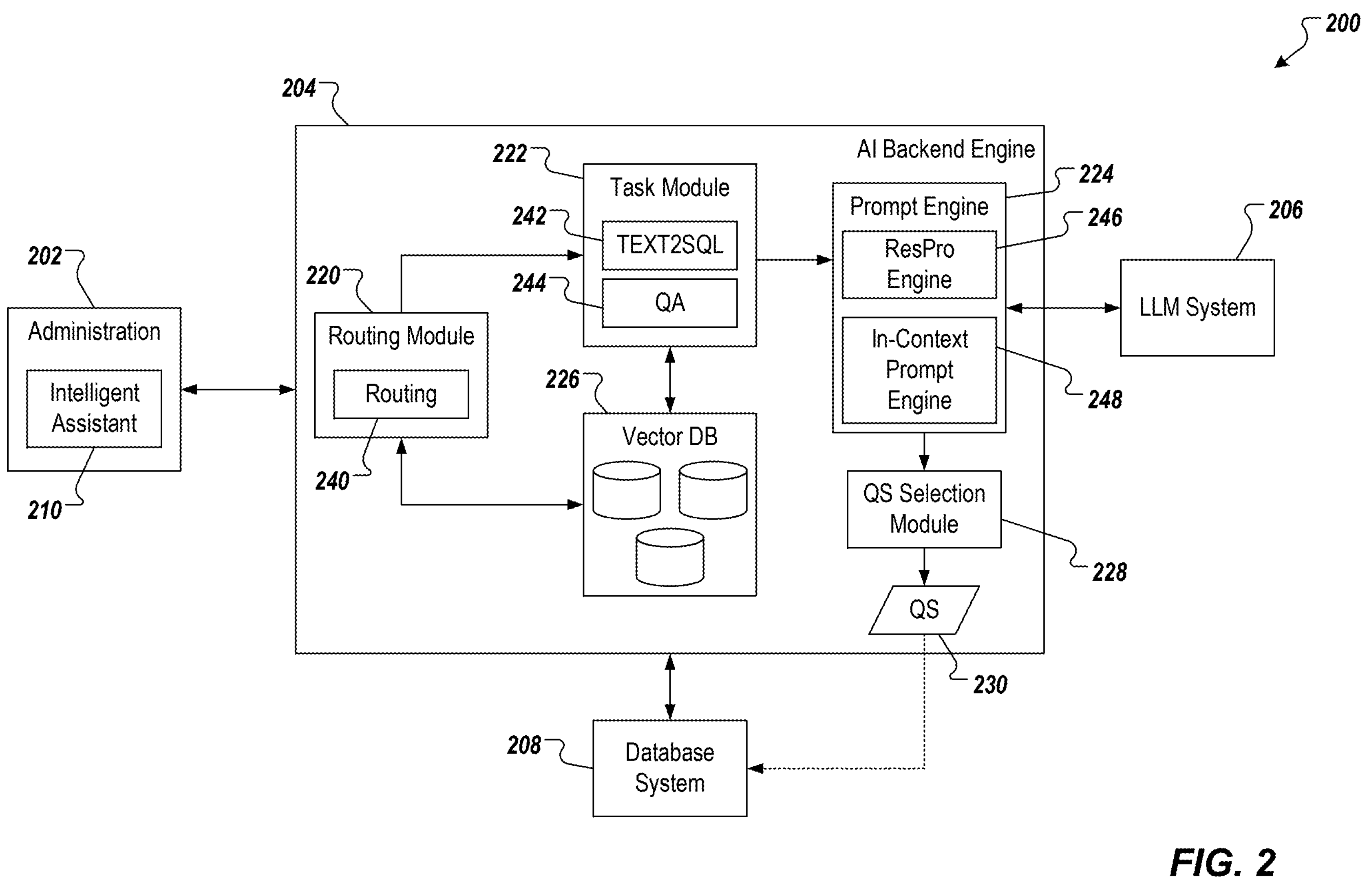
FIGS. 2 and 3 depict example conceptual architectures in accordance with implementations of the present disclosure.

FIG. 2 depicts an example conceptual architecture 200 in accordance with implementations of the present disclosure. In the depicted example, the conceptual architecture 200 includes an administration system 202, an artificial intelligence (AI) backend engine 204, a LLM system 206, and a database system 208. In some examples, the administration system 202 can be provided as SAP HANA Cloud Central and the database system 208 can be provided as an instance of SAP HANA Cloud. In the example of FIG. 2, the administration system 202 includes an intelligent assistant 210 (e.g., a chatbot) that can be used to receive input in natural language for processing, as described in further detail herein. For example, a user can request data from the database system 208 and can provide natural language input (e.g., a natural language question) that is processed, as described in detail herein, to provide a query statement for querying the database system 208.

In further detail, the administration system 202 is a consumer of the AI backend engine 204. In some examples, the AI backend engine 204 includes a routing module 220, a task module 222, a prompt engine 224, a vector database 226 (e.g., RAG system), and a query statement selection module 228. As described in further detail herein, the AI backend engine 204 processes a request from the administration system 202 to provide a query statement 230, which can be used to query the database system 208.

In some examples, the routing module 220 receives an input from the administration system 202 and processes the input using routing logic 240. For example, a user can interact with the administration system 202 through the intelligent assistant 210, an example interaction including the user providing a natural language input. In some examples, the natural language input can include a request of the user (e.g., a request for data and/or analytics on data stored in the database system 208). For purposes of non-limiting illustration, an example request of the user can include:

{QUESTION}: Please generate a SQL statement to query users whose password lifetime check is disabled.

Listing 1: Example User Request

In the example of Listing 1, the user is requesting a query statement that can be used to query the database system 208 for all users having a password lifetime check that is disabled.

In some implementations, the routing logic 240 can determine a task that corresponds to the natural language input from a set of tasks. For example, the routing logic 240 can process the natural language input to determine that the request of the user is to operate on data stored within the database system 208. As such, the routing logic 240 can determine that the task is to convert the natural language input to a query statement (e.g., a text2SQL task). In some examples, the routing module 220 routes tasks to appropriate task modules, such as the task module 222, for execution of the task. In the example of FIG. 2, the task is determined to be a text2SQL task and, in response, is routed to the task module 222 (e.g., among other task modules not shown).

In some implementations, the task module 222 facilitates execution of the task. In the depicted example, the task module 222 can facilitate execution of a text2SQL task 242, which can be described as a task to generate a query statement (SQL statement) from text (e.g., text of the natural language input). Another example task can include a question-answer (QA) task 244, which can be described as a task to answer a question regarding the database system 208. In some examples, in executing the task 242, the task module 222 queries the vector database 226 to receive context data that is relevant to the natural language input. In some examples, the vector database 226 stores a system table and information that is representative of query statements. In some examples, each segments of information, provided as respective chunks, for example, are each associated with a respective embedding (e.g., a multi-dimensional vector representing the question) that is representative of the respective information. In some examples, each embedding is generated by processing the respective information through an embedder.

Querying of the vector database 226 can include, for example, generating a question embedding (e.g., a multi-dimensional vector representing the question) using an embedder (e.g., the same embedder that was used to generate the embeddings of the vector database 226) and comparing the question embedding to each embedding of the vector database 226. In some examples, comparing can include generating a similarity score (e.g., cosine similarity) that represents a degree of similarity between the question embedding and a respective embedding. In some examples, a sub-set of embeddings is defined and includes embeddings having a similarity score that meets a threshold similarity score. In this manner, the embeddings of the sub-set of embeddings are determined to each have at least a threshold similarity to the question embedding. For each embedding in the sub-set of embeddings, respective information is retrieved from the vector database 226 to be used as context data for prompting of the LLM system 206.

More particularly, the vector database 226 stores table structure definitions, a sub-set of which can be retrieved as context data determined to be relevant to the question (e.g., {QUESTION} of Listing 1). For example, and as described above, a sub-set of embeddings is determined based on a question embedding, and table structure definitions can be returned as context data. Continuing with the example of Listing 1, the following example related scheme information can be returned from the vector database 226 as context data:

The M_EFFECTIVE_PASSWORD_POLICY system view provides information about password policy parameters for database users.

It has three columns: USER_NAME, PROPERTY, and VALUE.

The USER_NAME column displays the user that this password policy is valid for.

The PROPERTY column displays the password policy parameter.

The VALUE column displays the value of the password policy parameter.

This view requires an equal predicate on USER_NAME.

Structure:

USER_NAME: NVARCHAR(256), displays the user that this password policy is valid for;

PROPERTY: NVARCHAR(128), displays the password policy parameter;

VALUE: NVARCHAR(128), displays the value of the password policy parameter;

Examples:

SELECT “USER_NAME”, “PROPERTY”, “VALUE” FROM SYS. “M_EFFECTIVE_PASSWORD_POLICY” WHERE “USER_NAME”=‘SYSTEM’;

The USERS system view in SAP HANA Database provides a list of all users in the system, along with detailed information about each user, such as their user ID, user group, mode, external identity, creation time, validity period, password information, activation status, authentication methods, and more.

This view is particularly useful for administrators to monitor and manage user accounts, especially in terms of security and access control.

Depending on their privileges, users can see different values in this view.

Users with CATALOG READ or USERGROUP OPERATOR privileges can see all information for all users, while others can only see information specific to themselves.

Structure:

USER_NAME (NVARCHAR(256)): Name of the user;

USER_ID (BIGINT): ID of the user;

USERGROUP_NAME (NVARCHAR(256)): User group that the user belongs to;

USER_MODE (NVARCHAR(8)): Mode of the user (LOCAL/EXTERNAL);

EXTERNAL_IDENTITY (NVARCHAR(256)): External identity of the user; CREATOR (NVARCHAR(256)): Creator of the user;

CREATE_TIME (TIMESTAMP): Creation time of the user;

VALID_FROM (TIMESTAMP): Start time of the user’s validity;

VALID_UNTIL (TIMESTAMP): End time of the user’s validity;

LAST_SUCCESSFUL_CONNECT (TIMESTAMP): Time of the last successful connection;

LAST_INVALID_CONNECT_ATTEMPT (TIMESTAMP): Time of the last invalid connection attempt;

INVALID_CONNECT_ATTEMPTS (INTEGER): Number of invalid connection attempts since the last successful connection;

ADMIN_GIVEN_PASSWORD (NVARCHAR(5)): Whether the password was provided by the administrator or by the user (TRUE/FALSE);

LAST_PASSWORD_CHANGE_TIME (TIMESTAMP): Time of the last password change;

PASSWORD_CHANGE_NEEDED (NVARCHAR(5)): Whether the user is forced to change their password (TRUE/FALSE);

IS_PASSWORD_LIFETIME_CHECK_ENABLED (NVARCHAR(5)): Whether the password-lifetime will be checked for the user (TRUE/FALSE);

USER_DEACTIVATED (NVARCHAR(5)): Whether the user is deactivated (TRUE/FALSE);

DEACTIVATION_TIME (TIMESTAMP): Time given with an explicit deactivation command for the specified user;

IS_PASSWORD_ENABLED (NVARCHAR(5)): Whether authentication using a password is enabled (TRUE/FALSE);

IS_KERBEROS_ENABLED (NVARCHAR(5)): Whether authentication using KERBEROS is enabled (TRUE/FALSE);

IS_SAML_ENABLED (NVARCHAR(5)): Whether authentication using SAML is enabled (TRUE/FALSE);

IS_X509_ENABLED (NVARCHAR(5)): Whether authentication using an X.509 certificate is enabled (TRUE/FALSE);

IS_RESTRICTED (NVARCHAR(5)): Whether the user is missing the PUBLIC role and privilege on their own schema (TRUE/FALSE);

IS_RESTRICTED DETAILS (NVARCHAR(40)): Missing privilege(s) (ROLE PUBLIC/CREATE ANY ON OWN SCHEMA);

IS_CLIENT_CONNECT_ENABLED (NVARCHAR(5)): Whether the user is allowed to connect outside of applications (TRUE/FALSE);

HAS_REMOTE_USERS (NVARCHAR(5)): Whether the user has a remote identity mapping (TRUE/FALSE);

AUTHORIZATION_MODE (NVARCHAR(5)): Authorization mode of the user (LOCAL/LDAP);

IS_JWT_ENABLED (NVARCHAR(5)): Whether authentication using JWT is enabled (TRUE/FALSE);

IS_LDAP_ENABLED (NVARCHAR(5)): Whether authentication using LDAP is enabled (TRUE/FALSE);

CREATE_PROVIDER_TYPE (NVARCHAR(16)): Type of provider that created the user (LDAP PROVIDER/SAML PROVIDER) or NULL if the user was created by another user;

CREATE_PROVIDER_NAME (NVARCHAR(256)): Name of the provider that created the user, or NULL if the user was created by a user.

Examples:

SELECT "USER_NAME", "USER_ID", "USER_MODE", "CREATE_TIME" FROM "SYS". "USERS" WHERE "USER_NAME"='SYSTEM';

Listing 2: Example Context Data ({CONTEXT DATA})

In some implementations, the prompt engine 224 processes the output of the task module 222 to prompt the LLM system 206. In some examples, the prompt engine 224 includes a residual prompt (respro) engine 246 and an in-context prompt engine 248. In some examples, the respro engine 246 handles the task 242 and the in-context prompt engine 248 handles the task 244. In some examples, the prompt engine 224 can generate a set of prompts for the tasks 242, 244.

Example prompts in the set of prompts can include an in-context prompt, a CoT prompt, a contrastive CoT prompt, and a MoE prompt. In some examples, an in-context prompt can be described as a type of prompt that provides the LLM with additional context about the task at hand. This can be done by providing the LLM with one or more examples of the desired output, or by providing the LLM with a description of the task in more detail. In some examples, a CoT prompt is a type of prompt that guides a LLM through a series of steps to perform the task. In some examples, a contrastive CoT prompt is a type of prompt that provides the LLM with both positive examples and negative examples of how to perform the task. This helps the LLM to learn not only the correct steps to take, but also the steps to avoid.

Figure 3:
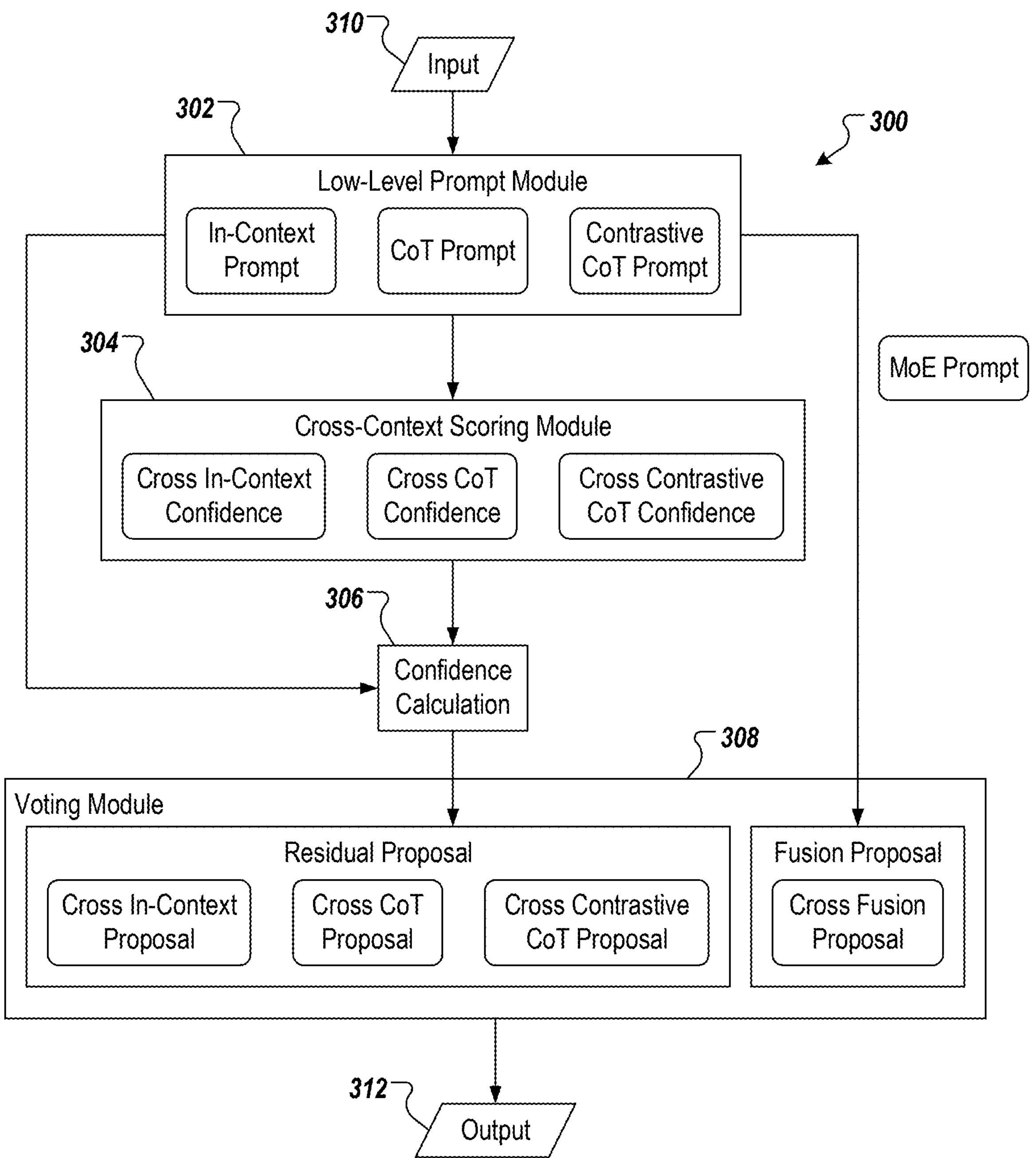

FIG. 3 depicts an example conceptual architecture 300 in accordance with implementations of the present disclosure. In some examples, the example conceptual architecture 300 is representative of the respro engine 246 of FIG. 2. In the example of FIG. 3, the example conceptual architecture 300 includes a low-level prompt module 302, a cross-context scoring module 304, a confidence calculation module 306, and a voting module 308. In accordance with implementations of the present disclosure, an input 310 is provided and can include a question from a user (e.g., see Listing 1) and is processed to provide a set of proposals from the LLM system, each proposal being a query statement generated by the LLM system, and a proposal is selected as output 312. In some examples, the output 312, as a query statement, that can be executed over the database system to return a response (e.g., data of the database system that is responsive to the query statement).

In some implementations, the low-level prompt module 302 generates an in-context prompt, a CoT prompt, and a contrastive CoT prompt, and prompts the LLM system 206 using each, to provide multiple query statements (e.g., a query statement for each prompt). In some examples, each prompt is generated using a respective prompt template, which includes static text and placeholder text.

Examples prompts are discussed in further detail herein. In the example prompts, { } indicate placeholders that refer to content that is to be included as part of the prompt. For example, and in the examples below, {QUESTION} is a placeholder for the question (natural language input) received from the user (e.g., see Listing 1), {CONTEXT DATA} is a placeholder for the context data retrieved from the vector database 226 (e.g., see Listing 2), and {EXAMPLES} is a placeholder for one or more examples that the LLM can use as reference for response.

Continuing with the non-limiting examples above, an example in-context prompt can be provided as:

You are a helpful SQL assistant expert for SAP HANA that helps users with generating a SQL query for the {QUESTION} based on the {CONTEXT DATA}.

Format the output as JSON with the keys "proposal", "type", "summary" and "confident".

1. "proposal" is the generated SQL string,
2. "type" is "IN-CONTEXT"
3. "summary" is a short summary to the human, summary should not be same as user's QUESTION.
4. "confidence" is the quality score of the target SQL, the value ranges from 0 to 1.

This is an example:

```
{
  type: 'IN-CONTEXT',
  proposal: "target SQL",
  summary: "Summary content",
  confidence: "0~1"
}
```

Listing 3: Example In-Context Prompt

An example CoT prompt can be provided as:

You are a helpful SQL assistant expert for SAP HANA that helps users with generating a SQL query for the {QUESTION} based on the instructions.

Instructions:

1. Extract the useful knowledge from the {CONTEXT DATA} for the {QUESTION}
2. Learning the knowledge from the {EXAMPLES} for the {QUESTION}.
3. Generate a SQL query that conforms to the syntax and functionality of SAP HANA Database based on step1 and step2.
4. Format the output as JSON with the keys "proposal", "type", "summary" and "confidence",
   1) "proposal" is the generated SQL string,
   2) "type" is "COT"
   3) "summary" is a short summary to the human, summary should not be same as user's QUESTION.
   4) "confidence" is the quality score of the target SQL, the value ranges from 0 to 1.

This is an example:

```
{
  type: 'COT',
  proposal: "target SQL",
  summary: "Summary content",
  confidence: "0~1"
}
```

Listing 4: Example CoT Prompt

For the example of Listing 4, {EXAMPLES} can be provided as:

Q1: Can you provide a SQL statement that fetches all users that are inactive?

A1: SELECT "USER_NAME", "USER_ID", "USER_DEACTIVATED" FROM "SYS". "USERS" WHERE "USER_DEACTIVATED"='TRUE';

Listing 5: Example of {EXAMPLES} for CoT Prompt

An example contrastive CoT prompt can be provided as:

You are a helpful SQL assistant expert for SAP HANA that helps users with generating a SQL query for the {QUESTION} based on the instructions.

Instructions:

1. Extract the useful knowledge from the {CONTEXT DATA} for the {QUESTION}.

2. Learning the knowledge of Correct Answer from the {EXAMPLES}. Pay more attention to the Wrong Answer and avoid carrying them into the target SQL.
3. Generate a SQL query that conforms to the syntax and functionality of SAP HANA Database based on step1 and step2.
4. Format the output as JSON with the keys "proposal", "type", "summary" and "confidence".
   1) "proposal" is the generated SQL string,
   2) "type" is "CONTRASTIVE-COT"
   3) "summary" is a short summary to the human, summary should not be same as user's {QUESTION}.
   4) "confidence" is the quality score of the target SQL, the value ranges from 0 to 1.
   This is an example:

```
{
  type: 'CONTRASTIVE-COT',
  proposal: "target SQL",
  summary: "Summary content",
  confidence: "0~1"}
```

Listing 6: Example Contrastive CoT Prompt

For the example of Listing 6, {EXAMPLES} can be provided as:

Question: Could you create a SQL query to select users who have disabled password lifetime checks?

Correct Answer: SELECT * FROM SYS. USERS WHERE IS_PASSWORD_LIFETIME_CHECK_ENABLED= 'FALSE';

Wrong Answer: SELECT "USER_NAME" FROM SYS."M_EFFECTIVE_PASSWORD_POLICY" WHERE "PROPERTY" 'LIFETIME CHECK' AND "VALUE"='DISABLED';

Listing 7: Example of {EXAMPLES} for Contrastive CoT Prompt

In some implementations, the prompt engine 224 prompts the LLM system 206 (e.g., through an application programming interface (API)) using each of the in-context prompt, the CoT prompt, and the contrastive CoT prompt, and the LLM system 206 returns respective responses. By way of non-limiting example, and continuing with the examples above, a response to the in-context prompt of Listing 3 can be provided as:

```
{
  "type": "IN-CONTEXT",
  "confidence": "0.8",
  "summary": "Query to retrieve users whose password lifetime check is disabled."
  "proposal": "SELECT USER_NAME, PROPERTY, VALUE FROM SYS.M_EFFECTIVE_PASSWORD_POLICY WHERE PROPERTY='IS_PASSWORD_LIFETIME_CHECK_ENABLED' AND VALUE='FALSE';"
}
```

Listing 8: Example Response to In-Context Prompt

A response to the CoT prompt of Listing 4 can be provided as:

```
{
  "type": "COT",
  "confidence": "0.9",
  "summary": "Query to fetch users whose password lifetime check is disabled",
  "proposal": "SELECT \"USER_NAME\", \"USER_ID\", \"IS_PASSWORD_LIFETIME_CHECK_ENABLED\" FROM \"SYS \". \"USERS\" WHERE "IS_PASSWORD_LIFETIME_CHECK_ENABLED\"='FALSE';"
}
```

Listing 9: Example Response to In-Context Prompt

A response to the contrastive CoT prompt of Listing 6 can be provided as:

```
{
  "type": "CONTRASTIVE-COT"
  "confidence": "0.9",
  "summary": "Query to fetch users whose password lifetime check is disabled"
  "proposal": "SELECT * FROM SYS. USERS WHERE IS_PASSWORD_LIFETIME_CHECK_ENABLED=' FALSE';"
}
```

Listing 10: Example Response to In-Context Prompt

Accordingly, each response is returned with a respective confidence. Using the non-limiting examples above, a set of confidences can be provided as:

TABLE 1

Example Low-Level Confidences

| Low-Level Confidence | Prompt Type | Value |
|---|---|---|
| $C_{low,ic}$ | In-Context | 0.8 |
| $C_{low,cot}$ | CoT | 0.9 |
| $C_{low,concot}$ | Contrastive CoT | 0.9 |

In some implementations, each of the in-context prompt, the CoT prompt, and the contrastive CoT prompt is processed by the cross-context scoring module to determine respective residual confidences. In some examples, a residual confidence prompt is generated and is used to prompt the LLM system 206. Continuing with the non-limiting examples above, an example residual confidence prompt can be provided as:

You are a helpful SQL Quality Assessment expert for SAP HANA that helps to determine which is the best proposal for the {QUESTION}.

Instructions:

1. Extract the useful knowledge from the {CONTEXT DATA} for the {QUESTION}.
2. Evaluate the quality of "IN-CONTEXT", "COT" and "CONTRASTIVE-COT" proposal from the {EXAMPLES}.
3. Generate the confidence of "IN-CONTEXT", "COT" and "CONTRASTIVE-COT" proposal based on step1 and step2.
4. Format the output as JSON array with the keys "type" and "confidence".
   1) "type" is type of expert
   2) "confidence" is the quality score of the target SQL, the value ranges from 0 to 1. 1 is the best score.
   3) The confidence of "IN-CONTEXT", "COT" and "CONTRASTIVE-COT" should be different.
   This is an example:

```
[
  {
    "type": "IN-CONTEXT",
    "confidence": "0"}
  },
  {
    "type": "COT",
    "confidence": "0"
```

```
{
  "type": "CONTRASTIVE-COT",
  "confidence": "0"}
]
```

Listing 11: Example Residual Confidence Prompt

For the example of Listing 11, {EXAMPLES} can be provided as:

```
[
  {
    "type": "IN-CONTEXT"
    "confidence": "0.8",
    "summary": "Query to retrieve users whose password lifetime check is disabled."
    "proposal": "SELECT USER_NAME, PROPERTY, VALUE FROM SYS.M_EFFECTIVE_PASSWORD_POLICY WHERE PROPERTY='IS_PASSWORD_LIFETIME_CHECK_ENABLED'
AND VALUE='FALSE';"
  },
  {
    "type": "COT",
    "confidence": "0.9",
    "summary": "Query to fetch users whose password lifetime check is disabled."
    "proposal": "SELECT \"USER_NAME\",
\"USER_ID\" \"IS_PASSWORD_LIFETIME_CHECK_ENABLED \" FROM \"SYS\". \"USERS\" WHERE "IS_PASSWORD_LIFETIME_CHECK_ENABLED\"
='FALSE';"
  },
  {
    "type": "CONTRASTIVE-COT",
    "confidence": "0.9",
    "summary": "Query to fetch users whose password lifetime check is disabled"
    "proposal": "SELECT * FROM SYS. USERS WHERE IS_PASSWORD_LIFETIME_CHECK_ENABLED='FALSE';"
  }
]
```

Listing 12: Example of {EXAMPLES} for Residual Confidence Prompt

A response to the residual confidence prompt of Listing 11 can be provided as:

```
[
  {
    "type": "IN-CONTEXT",
    "confidence": "0.7"
  },
  {
    "type": "COT",
    "confidence": "0.9"
  },
  {
    "type": "CONTRASTIVE-COT",
    "confidence": "0.8"
  }
]
```

Listing 13: Example Response to Residual Confidence Prompt

Accordingly, and using the non-limiting examples above, a set of residual confidences can be provided as:

TABLE 2

Example Residual Confidences

| Residual Confidence | Prompt Type | Value |
|---|---|---|
| $C_{res,ic}$ | In-Context | 0.7 |
| $C_{res,cot}$ | CoT | 0.9 |
| $C_{res,concot}$ | Contrastive CoT | 0.8 |

In some implementations, the set of confidences and the set of residual confidences are processed by the confidence calculation module 306 to provide a set of combined confidences. In some examples, each combined confidence is determined as an average of the confidence and the residual confidence for the respective prompt. Continuing with the non-limiting examples above, a set of combined confidences can be provided as:

TABLE 3

Example Combined Confidences

| Combined Confidence | Prompt Type | Value |
|---|---|---|
| $C_{com,ic}$ | In-Context | 0.75 |
| $C_{com,cot}$ | CoT | 0.9 |
| $C_{com,concot}$ | Contrastive CoT | 0.85 |

In some implementations, a MoE prompt is generated based on the results provided for each of the in-context prompt, the CoT prompt, and the contrastive CoT prompt. In some examples, the results provided for each of the in-context prompt, the CoT prompt, and the contrastive CoT prompt are used as examples ({EXAMPLES}) for the MoE prompt. Continuing with the examples provided above, an example MoE prompt can be provided as:

You are a helpful SQL assistant expert for SAP HANA that helps users with generating a SQL query for the {QUESTION} based on the instructions.

Instructions:

1. Extract the useful knowledge from {CONTEXT DATA} for the {QUESTION}.
2. Fuse the knowledge and advantage of the high-quality proposal from {EXAMPLES}. High confident of the proposal means high quality of the target SQL is good.
3. Generate a SQL query that conforms to the syntax and functionality of SAP HANA Database based on step1 and step2.
4. Format the output as JSON with the keys "proposal", "type", "summary" and "confidence".
   1) "proposal" is the generated SQL string,
   2) "type" is "MOE"
   3) "summary" is a short summary to the human, summary should not be same as user's {QUESTION}.
   4) "confidence" is the quality score of the target SQL, the value ranges from 0 to 1.
   This is an example:

```
{type: 'MOE',
  proposal: "target SQL",
  summary: "Summary content",
  confidence: "0~1"
}
```

Listing 13: Example MoE Prompt

For the example of Listing 13, {EXAMPLES} can be provided as:

1. The following are the three experts' proposals with the confidence.

[
  {
    "type": "IN-CONTEXT"
    "confidence": "0.8",
    "summary": "Query to retrieve users whose password lifetime check is disabled."
    "proposal": "SELECT USER_NAME, PROPERTY, VALUE FROM SYS.M_EFFECTIVE_PASSWORD_POLICY WHERE PROPERTY= 'IS_PASSWORD_LIFETIME_CHECK_ENABLED' AND VALUE='FALSE';"
  },
  {
    "type": "COT",
    "confidence": "0.9",
    "summary": "Query to fetch users whose password lifetime check is disabled."
    "proposal": "SELECT \"USER_NAME\", \" USER_ID\", \"IS_PASSWORD_LIFETIME_CHECK_ENABLED\" FROM \"SYS\". \"USERS \" WHERE "IS_PASSWORD_LIFETIME_CHECK_ENABLED\"='FALSE';"
  },
  {
    "type": "CONTRASTIVE-COT",
    "confidence": "0.9",
    "summary": "Query to fetch users whose password lifetime check is disabled"
    "proposal": "SELECT * FROM SYS. USERS WHERE IS_PASSWORD_LIFETIME_CHECK_ENABLED='FALSE';"
  }
]

2. The following is the bad knowledge from the experts.

Question: Could you create a SQL query to select users who have disabled password lifetime checks?

Correct Answer: SELECT * FROM SYS. USERS WHERE IS_PASSWORD_LIFETIME_CHECK_ENABLED='FALSE';

Wrong Answer: SELECT "USER_NAME" FROM SYS."M_EFFECTIVE_PASSWORD_POLICY" WHERE "PROPERTY"='LIFETIME_CHECK' AND "VALUE"='DISABLED';

Listing 14: Example of {EXAMPLES} for MoE Prompt

The LLM system is prompted using the MoE prompt and returns a result. Continuing with the examples above, an example result can be provided as:

{
  "type": "MOE",
  "confidence": "0.9",
  "summary": "Query to find users with disabled password lifetime check in SAP HANA."
  "proposal": "SELECT \"USER_NAME \", \"USER_ID\", \"IS_PASSWORD_LIFETIME_CHECK_ENABLED \" FROM \"SYS \". \"USERS\" WHERE \"IS_PASSWORD_LIFETIME_CHECK_ENABLED \"='FALSE';"
}

Listing 15: Example Result of MoE Prompt

In some examples, the result of the MoE prompt is referred to as a fusion proposal and the results of the in-context prompt, the CoT prompt, and the contrastive CoT prompt are collectively referred to as residual proposals.

In some implementations, the voting module 308 (e.g., the query selection module 228 of FIG. 2) selects one of the proposals (query statements) from the fusion proposal and the residual proposals. In some examples, the proposal having the highest confidence is selected. In some examples, if multiple proposals have the highest confidence, a proposal is selected based on a predefined priority of the prompts. An example of the predefined priority includes fusion, contrastive CoT, CoT, and in-context. For example, if the contrastive CoT and the CoT have the highest confidence, the proposal (query statement) resulting from the contrastive CoT prompt is selected in view of the priority.

Continuing with the examples above, a set of confidences can be provided as:

TABLE 4

Example Confidences

| Confidence | Prompt Type | Value |
|---|---|---|
| $C_{fus}$ | Fusion (MoE) | 0.9 |
| $C_{com,ic}$ | In-Context | 0.75 |
| $C_{com,cot}$ | CoT | 0.9 |
| $C_{com,concot}$ | Contrastive CoT | 0.85 |

Here, the fusion (MoE) result and the CoT result have the highest confidence values (0.9). In this example, the fusion (MoE) result is selected, because it is higher in priority than the CoT result. As such, the database system can be queried using the fusion (MoE) result as the query statement and a query result is returned to the user.

With regard to querying a database system, such as the database system 208 of FIG. 2, a query that includes the selected query statement is processed to provide a query result. The query result includes data stored within the database system, the data being responsive to the query. In further detail, a parser of the database system includes a syntax checker and a semantics checker. In some examples, the parser parses the query to define a data structure that enables further processing. In some examples, the data structure is an abstract syntax tree (AST), which can be described as a tree representation of the abstract syntactic structure of the query written in a query language (e.g., SQL). The syntax checker processes the query to ensure that the query is syntactically correct (e.g., conforms to rules for syntactically correct queries). The semantics checker processes the query to ensure that the query is semantically correct. The semantics check can generally be described as determining whether a statement is meaningful in terms of what is being requested from the database system. That is, for example, whether the objects (e.g., tables, columns, views, procedures) in the statement actually exist within the database system. In some examples, the semantics checker also performs an authorization check to ensure that the user is authorized to view data returned in response to the query.

If the syntax check, the semantics check, and the authorization check are all passed (i.e., there is no syntax error, there is no semantics error, there is no authorization error), the AST of the query is provided to an optimizer, which provides a query execution plan (QEP). In some examples, the QEP is a list of programmatic instructions that are to be executed to provide the query result. In some examples, the QEP includes a number of operations, which can include, for example and without limitation, read and write operations. In general, the QEP defines the sequence in which tables are accessed, methods used to extract data from each table, and methods for computing calculations, filtering, aggregating, and/or sorting data from each table. An execution engine of the database system executes the QEP provided by the optimizer to provide the query result.

Figure 4:
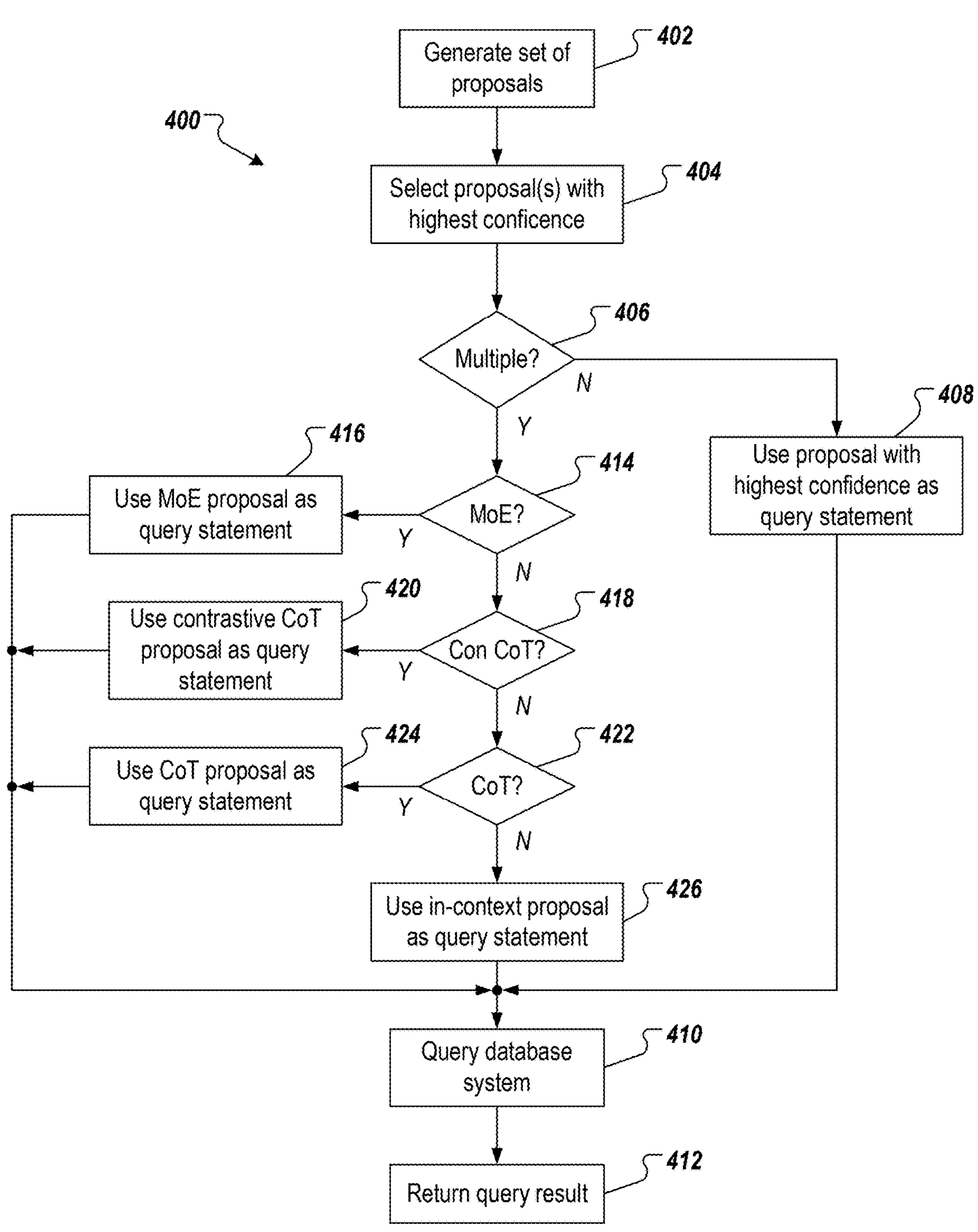
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices.

A set of proposals is generated (402). For example, and as described in detail herein, the prompt engine 224 of FIG. 2 receives user input (e.g., {QUESTION} in natural language), context data (e.g., {CONTEXT DATA}) provided from the vector database 226 and generates an in-context prompt, a CoT prompt, and a contrastive CoT prompt. The prompt engine 224 prompts the LLM system 206 using each of the in-context prompt, the CoT prompt, and the contrastive CoT prompt, which returns respective results. In some examples, the results include a first proposal generated in response to the in-context prompt, a second proposal generated in response to the CoT prompt, and a third proposal generated in response to the contrastive CoT prompt. Each of the results includes a low-level confidence associated therewith. In some examples, the prompt engine 224 prompts the LLM system 206 using a residual confidence prompt, which returns a set of residual confidence scores for the first proposal, the second proposal, and the third proposal. In some examples, a set of combined confidences is determined based on the set of low-level confidences and the set of residual confidences. In some examples, the prompt engine 224 prompts the LLM system 206 using a MoE prompt and the LLM system 206 returns a fourth proposal that is associated with fusion confidence.

A sub-set of proposals is selected to include one or more proposals having a highest confidence score (404). For example, and as described in detail herein, confidence scores of each of the first proposal, the second proposal, the third proposal, and the fourth proposal are compared, and one or more proposals having a highest confidence is included in the sub-set of proposals. It is determined whether there are multiple proposals included in the sub-set of proposals (406). For example, is multiple proposals include the highest confidence, the multiple proposals are included in the sub-set of proposals.

If there are not multiple proposals included in the sub-set of proposals, the proposal in the sub-set is selected as the query statement (408), the database system is queried (410), and a query result is returned (412). For example, and as described in detail herein, the proposal, which is a query statement, is used to query the database system, which returns query results responsive to the query statement, as described herein. In some examples, the proposal is provide to a user (e.g., the user that had submitted the natural language input that the proposal was generated in response to), and the user queries the database system. In some examples, the database system is automatically queried using the proposal and a query result is returned to the user.

If there are multiple proposals included in the sub-set of proposals, it is determined whether the sub-set of proposals includes a fusion proposal returned in response to the MoE prompt (414). If the sub-set of proposals includes a fusion proposal, the fusion proposal is selected as the query statement (416), the database system is queried (410), and a query result is returned (412). If the sub-set of proposals does not include a fusion proposal, it is determined whether the sub-set of proposals includes a contrastive CoT proposal returned in response to the contrastive CoT prompt (418). If the sub-set of proposals includes a contrastive CoT proposal, the contrastive CoT proposal is selected as the query statement (420), the database system is queried (410), and a query result is returned (412). If the sub-set of proposals does not include a contrastive CoT proposal, it is determined whether the sub-set of proposals includes a CoT proposal returned in response to the CoT prompt (422). If the sub-set of proposals includes a CoT proposal, the CoT proposal is selected as the query statement (424), the database system is queried (410), and a query result is returned (412). If the sub-set of proposals does not include a CoT proposal, the in-context proposal is selected as the query statement (426), the database system is queried (410), and a query result is returned (412).

Implementations of the present disclosure provide multiple technical improvements. For example, as described herein, implementations of the present disclosure enable leveraging of LLMs to automatically generate query statements that are accurate and resource-efficient during execution in a database system. In some examples, this is achieved by integrating both error-prone and correct query statements used as examples. Implementations of the present disclosure enables LLMs to fully comprehend the syntax of the particular query language and database system (e.g., HANA SQL syntax), which improves the accuracy of the query statements that are generated. Implementations of the present disclosure introduce the MoE prompting methodology, which the comprehensive integration of information from proposals generated using in-context, CoT, and contrastive-CoT. In this manner, the accuracy of the query statements that are generated is further improved. Further, implementations of the present disclosure provide proposal selection based on residual-confidence voting, which enables the most accurate and resource-efficient query statement to be selected from the in-context proposal, the CoT proposal, the contrastive-CoT proposal, and the MoE proposal.

Figure 5:
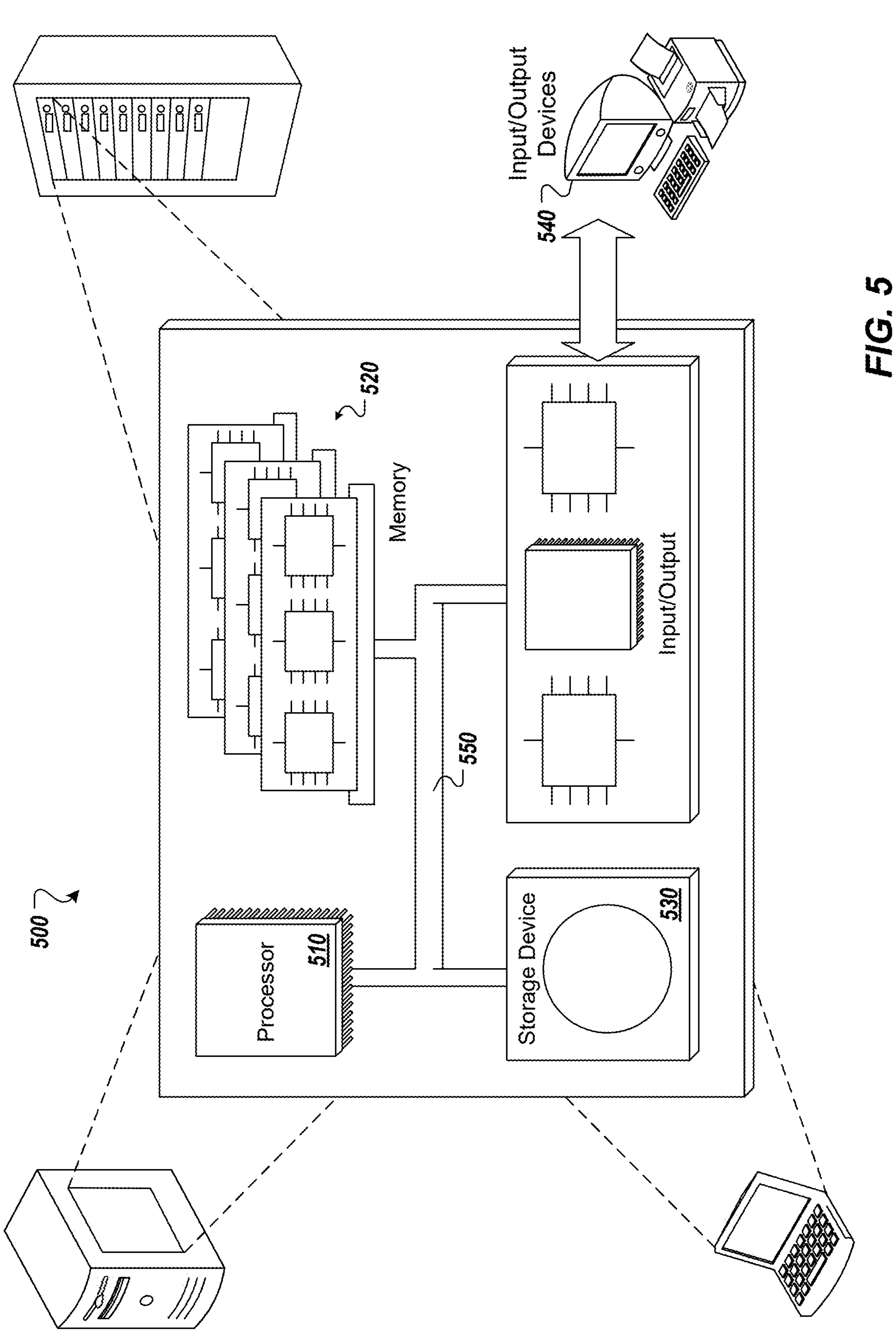
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a backend component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for querying database systems to generate query results, the method being executed by one or more processors and comprising:

receiving user input comprising natural language text;

generating a set of prompts using the user input, the set of prompts comprising a first prompt, a second prompt, and a third prompt;

prompting a large language model (LLM) using each of the first prompt, the second prompt, and the third prompt to receive a first result responsive to the first prompt, a second result responsive to the second prompt, and a third result responsive to the third prompt, the first result being associated with a first confidence, the second result being associated with a second confidence, and the third result being associated with a third confidence;

prompting the LLM based on the first result, the second result, and the third result to provide a first residual confidence associated with the first result, a second residual confidence associated with the second result, and a third residual confidence associated with the third result;

aggregating the first confidence and the first residual confidence, the second confidence and the second residual confidence, and the third confidence and the third residual confidence to provide a first combined confidence associated with the first result, a second combined confidence associated with the second result, and a third combined confidence associated with the third result;

prompting the LLM using a fourth prompt that is generated based on each of the first result, the second result, and the third result to receive a fourth result responsive to the fourth prompt, the fourth result being associated with a fourth confidence;

selecting a query statement from one of the first result, the second result, the third result, and the fourth result based on the first combined confidence, the second combined confidence, the third combined confidence, and the fourth confidence; and executing a query within the database system to provide a query result, the querying comprising the query statement.

2. The method of claim 1, wherein the first prompt comprises an in-context prompt, the second prompt comprises a chain-of-though (CoT) prompt, and the third prompt comprises a contrastive CoT prompt.

3. The method of claim 1, wherein the second prompt comprises a first example set comprising at least one correct example and the third prompt comprises a second example set comprising a correct example and an incorrect example.

4. The method of claim 1, wherein the fourth prompt comprises an example set comprising at least a portion of each of the first result, the second result, and the third result.

5. The method of claim 4, wherein the example set further comprises a correct example and an incorrect example.

6. The method of claim 1, further comprising querying a vector database at least partially based on the user input to determine context data, wherein each of the first prompt, the second prompt, the third prompt, and the fourth prompt incorporates the context data.

7. The method of claim 6, wherein the context data comprises a description of a data schema of tables stored within the database system.

8. A non-transitory computer-readable storage medium coupled to one or more processors and having instructions stored thereon which, when executed by the one or more processors, cause the one or more processors to perform operations for querying database systems to generate query results, the operations comprising:

receiving user input comprising natural language text;

generating a set of prompts using the user input, the set of prompts comprising a first prompt, a second prompt, and a third prompt;

prompting a large language model (LLM) using each of the first prompt, the second prompt, and the third prompt to receive a first result responsive to the first prompt, a second result responsive to the second prompt, and a third result responsive to the third prompt, the first result being associated with a first confidence, the second result being associated with a second confidence, and the third result being associated with a third confidence;

prompting the LLM based on the first result, the second result, and the third result to provide a first residual confidence associated with the first result, a second residual confidence associated with the second result, and a third residual confidence associated with the third result;

aggregating the first confidence and the first residual confidence, the second confidence and the second residual confidence, and the third confidence and the third residual confidence to provide a first combined confidence associated with the first result, a second combined confidence associated with the second result, and a third combined confidence associated with the third result;

prompting the LLM using a fourth prompt that is generated based on each of the first result, the second result, and the third result to receive a fourth result responsive to the fourth prompt, the fourth result being associated with a fourth confidence;

selecting a query statement from one of the first result, the second result, the third result, and the fourth result based on the first combined confidence, the second combined confidence, the third combined confidence, and the fourth confidence; and executing a query within the database system to provide a query result, the querying comprising the query statement.

9. The non-transitory computer-readable storage medium of claim 8, wherein the first prompt comprises an in-context prompt, the second prompt comprises a chain-of-though (CoT) prompt, and the third prompt comprises a contrastive CoT prompt.

10. The non-transitory computer-readable storage medium of claim 8, wherein the second prompt comprises a first example set comprising at least one correct example and the third prompt comprises a second example set comprising a correct example and an incorrect example.

11. The non-transitory computer-readable storage medium of claim 8, wherein the fourth prompt comprises an example set comprising at least a portion of each of the first result, the second result, and the third result.

12. The non-transitory computer-readable storage medium of claim 11, wherein the example set further comprises a correct example and an incorrect example.

13. The non-transitory computer-readable storage medium of claim 8, wherein operations further comprise querying a vector database at least partially based on the user input to determine context data, wherein each of the first prompt, the second prompt, the third prompt, and the fourth prompt incorporates the context data.

14. The non-transitory computer-readable storage medium of claim 13, wherein the context data comprises a description of a data schema of tables stored within the database system.

15. A system, comprising:

a computing device; and a computer-readable storage device coupled to the computing device and having instructions stored thereon which, when executed by the computing device, cause the computing device to perform operations for querying database systems to generate query results, the operations comprising:

receiving user input comprising natural language text;

generating a set of prompts using the user input, the set of prompts comprising a first prompt, a second prompt, and a third prompt;

prompting a large language model (LLM) using each of the first prompt, the second prompt, and the third prompt to receive a first result responsive to the first prompt, a second result responsive to the second prompt, and a third result responsive to the third prompt, the first result being associated with a first confidence, the second result being associated with a second confidence, and the third result being associated with a third confidence;

prompting the LLM based on the first result, the second result, and the third result to provide a first residual confidence associated with the first result, a second residual confidence associated with the second result, and a third residual confidence associated with the third result;

aggregating the first confidence and the first residual confidence, the second confidence and the second residual confidence, and the third confidence and the third residual confidence to provide a first combined confidence associated with the first result, a second combined confidence associated with the second result, and a third combined confidence associated with the third result;

prompting the LLM using a fourth prompt that is generated based on each of the first result, the second result, and the third result to receive a fourth result responsive to the fourth prompt, the fourth result being associated with a fourth confidence;

selecting a query statement from one of the first result, the second result, the third result, and the fourth result based on the first combined confidence, the second combined confidence, the third combined confidence, and the fourth confidence; and executing a query within the database system to provide a query result, the querying comprising the query statement.

16. The system of claim 15, wherein the first prompt comprises an in-context prompt, the second prompt comprises a chain-of-though (CoT) prompt, and the third prompt comprises a contrastive CoT prompt.

17. The system of claim 15, wherein the second prompt comprises a first example set comprising at least one correct example and the third prompt comprises a second example set comprising a correct example and an incorrect example.

18. The system of claim 15, wherein the fourth prompt comprises an example set comprising at least a portion of each of the first result, the second result, and the third result.

19. The system of claim 18, wherein the example set further comprises a correct example and an incorrect example.

20. The system of claim 15, wherein operations further comprise querying a vector database at least partially based on the user input to determine context data, wherein each of the first prompt, the second prompt, the third prompt, and the fourth prompt incorporates the context data.

* * * * *